(12) United States Patent
Barlsen et al.

(10) Patent No.: US 8,267,485 B2
(45) Date of Patent: Sep. 18, 2012

(54) ELECTRONIC BRAKING SYSTEM AND METHOD FOR DRAWBAR TRAILERS

(75) Inventors: Holger Barlsen, Langenhagen (DE); Axel Stender, Hameln (DE); Ingo Tha, Hannover (DE); Norbert Witte, Lauenau (DE); Markus Wolf, Hildesheim (DE)

(73) Assignee: WABCO GmbH, Hannover (DE)

( * ) Notice: Subject to any disclaimer, the term of this patent is extended or adjusted under 35 U.S.C. 154(b) by 527 days.

(21) Appl. No.: 12/386,963

(22) Filed: Apr. 23, 2009

(65) Prior Publication Data
US 2009/0273232 A1 Nov. 5, 2009

(30) Foreign Application Priority Data
May 2, 2008 (DE) .................. 10 2008 022 026

(51) Int. Cl.
*B60T 13/74* (2006.01)
*B60T 8/18* (2006.01)
*B60T 7/20* (2006.01)

(52) U.S. Cl. ............... 303/3; 303/7; 303/9.69; 303/123; 303/198

(58) Field of Classification Search .............. 303/3, 7, 303/9.61, 9.62, 9.69, 9.71, 9.66, 123
See application file for complete search history.

(56) References Cited

U.S. PATENT DOCUMENTS

| | | | | |
|---|---|---|---|---|
| 6,079,790 | A * | 6/2000 | Broome | 303/3 |
| 7,114,787 | B2 * | 10/2006 | Mederer et al. | 303/123 |
| 7,134,733 | B2 * | 11/2006 | Eckert et al. | 303/123 |
| 2001/0033105 | A1 * | 10/2001 | Frank et al. | 303/9.62 |
| 2008/0067862 | A1 * | 3/2008 | Parrott et al. | 303/7 |

FOREIGN PATENT DOCUMENTS
DE 197 07 210 8/1998
WO WO 03/011664 2/2003

* cited by examiner

*Primary Examiner* — Thomas J Williams
(74) *Attorney, Agent, or Firm* — Kramer Levin Naftalis & Frankel LLP (57) ABSTRACT

A system and method for braking a drawbar trailer having a front axle and one or more further axles, each axle having at least two wheels, includes first sensors which sense the axle load of at least one axle, and second sensors which sense the rotational wheel speeds. Brakes actuatable with a pneumatic brake pressure brake the trailer. Brake signals generated in the towing vehicle are transmitted between the towing vehicle and the trailer. A control unit receives these brake signals and the sensor signals, and determines the axle load. The operating pressure is adapted to the brake pressure which is fed to the brakes. The control unit detects the brake pressure value as a function of (i) the specific axle loads of the front axle and the other axles and (ii) the received brake signals, and actuates the brakes such that the detected brake pressure is made available.

20 Claims, 1 Drawing Sheet

ELECTRONIC BRAKING SYSTEM AND METHOD FOR DRAWBAR TRAILERS

FIELD OF THE INVENTION

The present invention relates generally to a braking system and method for braking a drawbar trailer.

BACKGROUND OF THE INVENTION

In braking a vehicle, for example, a utility vehicle or a trailer, it is advantageous to achieve the shortest possible braking distance while, at the same time, maintaining vehicle stability. For this purpose, the adhesion between the vehicle wheels and the road surface should be utilized to a maximum degree while avoiding wheel lock.

Adhesion as used herein refers to that force which can be transmitted between the wheels and the road surface without the wheels locking. Wheel lock brings about a vehicle state which can be controlled only with difficulty and which is to be avoided. Adhesion between the wheels and the road depends on the frictional force between the contact faces of the wheels and the road surface, which force is, in turn, dependent on the acting weight force. On identical road surfaces, a wheel which is subject to a heavy load, for example, owing to an unevenly distributed cargo, will transmit a larger braking force to the road than one which is subject to a lighter load, and, consequently, a higher degree of adhesion occurs at the wheel which bears a heavier load.

In order to achieve maximum braking effect in, for example, a case of full braking, each wheel should, ideally, be braked in accordance with its instantaneous maximum adhesion. However, this requires that the load on each wheel be known and that each wheel can be braked individually with a corresponding braking force. Since brakes which can be actuated in a mainly pneumatic fashion are used in the construction of utility vehicles, a separate valve for providing the brake pressure which is different for each wheel has to be made available for each brake, and this makes the corresponding braking system very complex and more costly.

Nevertheless, in order to be able to brake with the best possible braking force, it is expedient to detect the load on each axle, rather than the load on each wheel individually, and to calculate therefrom a braking force by which all the wheels of the respective axle are braked. This is based on the knowledge that differences in loading or the adhesion between the wheels of an axle are significantly smaller than such differences between wheels on different axles. It is therefore acceptable to apply the same braking force to the wheels on one axle. In this way, the corresponding braking system can be made simpler and, therefore, more cost-effective.

With respect to axle loads, a distinction is made between a static component, which is present when the vehicle is stationary or when travel is occurring without braking and without acceleration, and a dynamic component, which is superimposed on the static component when the vehicle is operating. The static component is determined essentially by the design and the geometry of the vehicle and the cargo. The dynamic component is determined, in particular, by acceleration processes and deceleration processes. The sum of the static and dynamic components of the axle load is referred to as the instantaneous axle load, which is dependent on acceleration and deceleration and has a significant influence on the instantaneous adhesion, which is relevant for braking processes.

When a vehicle, which has two axles and a height of the center of gravity above the axle, is decelerated, the front axle bears a greater load, while the rear axle is relieved of its load by the same degree. This is dependent on the deceleration value, the static axle loads of the front and rear axles and the geometric properties of the vehicle (for example length and position of the center of gravity of the vehicle).

In order to be able to brake the vehicle optimally, knowledge of the instantaneous axle load of each vehicle axle is necessary. One way to detect the instantaneous axle load is by means of axle load sensors mounted on the axles. However, this is complex and expensive. A simplified approach is to determine the instantaneous axle load of just one axle. For this purpose, a signal which corresponds to the static axle load is detected during travel without braking and without acceleration, and another signal which corresponds to the instantaneous axle load is detected during braking. The instantaneous axle load of the other axle, which is not provided with an axle load sensor, can be extrapolated from the difference between the instantaneous axle load and the static axle load if the distribution of the static axle loads between the front axle and the further axle is known. Such distribution is generally known since it plays a significant role in drawbar trailer design. Alternatively, such distribution could be detected by means of a testing device, for example, in a workshop. However, the instantaneous axle load of one axle can be inferred in vehicles with two axles only if the instantaneous axle load of the other axle is known; if further axles are present, it is necessary to use further axle load sensors.

One possible way of dispensing with further axle load sensors is described in DE 197 07 210. According to DE 197 07 210, the determination of the braking forces is carried out using an axle load sensor, but the rotational speeds of the vehicle wheels are additionally taken into account, instead of detecting the instantaneous axle load of the further axles by means of further axle load sensors. What is referred to as a difference in slip, which is used to detect the braking force, is detected on the basis of the differences between the rotational speeds of the individual vehicle axles. In this context, each wheel is assigned an optimal braking pressure, which makes the braking system complex.

Preferably, a 4S/3M configuration is used for drawbar trailers. Two wheel sensors and one electronic braking system (EBS) valve are arranged on the steering axle. An EBS valve can automatically modulate brake pressure. The wheel which first exhibits a tendency to lock, dominates the anti-lock braking system (ABS) control of the respective axle. This control is carried out according to the principle of modified axle regulation (MAR). One ABS modulator and one pressure regulating duct of an EBS modulator are used for individual regulation of the individual wheels on each further axle. Conventional braking systems of this type use three-channel brake pressure control and three-channel ABS control, as a result of which the costs are not competitive.

WO 03/011664 describes a braking system for utility vehicle trailers which have steerable front axles. In this braking system, the number of axle load sensors can be reduced since the system can also be operated without the front axle having an axle load sensor (pressure sensor). A disadvantage of a braking system of this type is that the front axle cannot be electronically braked if a pneumatic brake pressure is not made available by the towing vehicle. With such a system it is not possible to carry out stability control since this requires the wheels to be able to be actuated independently of the driver's request.

SUMMARY OF THE INVENTION

Generally speaking, in accordance with embodiments of the present invention, a drawbar trailer braking system and method are provided which overcome disadvantages associated with conventional systems and methods.

The braking system and method in accordance with embodiments of the present invention are provided to brake a drawbar trailer having a front axle and one or more further axles, each axle having at least two wheels. Sensors are employed for generating signals which relate to the axle load of at least one axle, where, in each case, one of the sensor signals is assigned to each axle. Sensors for generating sensor signals which relate to the rotational speed of the wheels of the axles are also employed—in each case, one of the sensor signals is assigned to each axle. A pressure accumulator makes available and stores a pneumatic operating pressure. Brakes, which can be actuated with a pneumatic brake pressure, brake the drawbar trailer. A brake line and/or a transmission unit transmit brake signals, generated in the towing vehicle, between the towing vehicle and the drawbar trailer. A control unit receives the brake signals generated in the towing vehicle as well as the sensor signals, and determines the axle load. The value of the operating pressure is adapted to the brake pressure, where the brake pressure can be fed to the brakes, which can be actuated by a drive unit, via feed lines. The control unit detects the value of the brake pressure for actuating the brakes as a function of (i) the specific axle load of the front axle and of the other axles, as well as (ii) the received brake signals, and actuates the brakes such that the detected brake pressure is made available.

The control unit therefore detects just a single brake pressure, with the result that the operating pressure which is present in the pressure accumulator need be adapted to only one brake pressure. Only one component for adapting pressure is therefore necessary. With this brake pressure, it is possible to actuate all of the brakes present on the drawbar trailer, with the result that it is not necessary to detect a separate brake pressure for each vehicle axle. In this way, one central feed line is sufficient, and it is used to feed the brake pressure to the brakes, which contributes to simplification and reduction of the costs of the braking system. Also, the fewer the number of feed lines that are required, the lower the probability of failure, which generally increases with the number of components used and the length of the line.

In addition, the computing steps which are to be carried out by the control unit are less extensive compared to conventional solutions since just one brake pressure has to be detected individually for the entire braking system, and not for each wheel to be braked. For this purpose, the brake pressure is calculated from the mean value of the detected axle loads. Therefore, a single brake pressure is detected only if different axle loads are present on the front axle or on the further axles. The same brake pressure is modulated at the axles, and, therefore, at the wheels. As a result, the control unit can, on the one hand, be of simple design and, on the other hand, it can carry out more computing operations in the same time compared to conventional braking systems. The detected brake pressure can therefore be adapted repeatedly to the frequently changing driving states of the vehicle, with the result that the detected brake pressure takes into account the current driving states in real-time without the computing capacity having to be increased for this purpose. This makes a considerable contribution to increasing the safety of the vehicle in traffic, and, at the same time, lowers the cost of the braking system.

It is, accordingly, an object of the present invention to provide a drawbar trailer braking system and method whereby axle-load-dependent distribution of braking force is made possible at any desired number of axles of the drawbar trailer while maintaining vehicle stability.

It is also an object of the present invention to provide a simple drawbar trailer braking system construction including as few components as possible.

It is a further object of the present invention to enable a drawbar trailer braking operation by electronic means even if no pneumatic control pressure is made available by the towing vehicle.

Still other objects and advantages of the invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

The braking system and method in accordance with embodiments of the present invention are provided to brake a drawbar trailer having a front axle and one or more further axles, each axle having at least two wheels. First sensors are employed for generating signals which relate to the axle load of at least one axle, where, in each case, one of the sensor signals is assigned to each axle. Second sensors for generating sensor signals which relate to the rotational speed of the wheels of the axles are also employed—in each case, one of the sensor signals being assigned to each axle. A pressure accumulator makes available and stores a pneumatic operating pressure. Brakes, which can be actuated with a pneumatic brake pressure, brake the drawbar trailer. A brake line and/or a transmission unit transmit brake signals, generated in the towing vehicle, between the towing vehicle and the drawbar trailer. A control unit receives the brake signals generated in the towing vehicle as well as the sensor signals, and determines the axle load. The value of the operating pressure is adapted to the brake pressure, where the brake pressure can be fed to the brakes, which can be actuated by a drive unit, via feed lines. The control unit detects the value of the brake pressure for actuating the brakes as a function of (i) the specific axle load of the front axle and of the other axles as well as (ii) the received brake signals, and actuates the brakes such that the detected brake pressure is made available.

According to an embodiment of the present invention, one of the first sensors is assigned to the front axle. In this embodiment, the braking system includes just a first sensor. All the information that is required to safely brake the drawbar trailer can be acquired using the second sensors. It is therefore possible to minimize the use of first sensors in order to minimize cost. In addition, reducing the number of first sensors simplifies the cabling, which reduces the likelihood of incorrect cabling.

In modern trailers, the second sensors for detecting the wheel speeds are present on a series-produced basis and are used, for example, for ABS control systems. Reducing the number of second sensors would not appreciably reduce the costs of the braking system. In addition, locking of the wheels can only be reliably detected by means of the rotational speed. So, reducing the number of second sensors would not be beneficial, and ABS control of all the wheels would not be possible. This runs counter to efforts to increase driving safety.

The first sensors are advantageously embodied as pressure sensors or as travel sensors. Sensors of this type are widely used in vehicle manufacturing, and are therefore manufactured in large numbers and, as a result, are available at low cost. Furthermore, these sensors are distinguished by a high level of reliability, which increases the functional capability of the braking system. Modern utility vehicles frequently have such sensors, for example, for checking the maximum permissible cargo or for ride level control, so that this embodiment of the present invention can use sensors which are already present. It is not necessary to construct an additional sensor system and no appreciable additional costs are incurred.

According to an advantageous embodiment of the present invention, the second sensors include a pole wheel and an ABS sensor. The rotational speeds of the wheels of the vehicle can be detected easily using these components (which are, nowadays, standard equipment on vehicles). It is possible, therefore, to use components that are already present, without an additional sensor system having to be provided. This configuration also contributes to lowering the costs of the braking system.

In some embodiments, additional first sensors may be provided on one or more further axles to generate sensor signals which relate to the axle load of the one or more further axles. It is therefore possible to equip not only the front axle but also at least the second axle or all the axles with sensors for generating signals which relate to the axle load. These signals can be used to display the axle load of each axle. In certain cases, it is necessary for the driver to have precise knowledge of the axle loads of all the axles, for example in order to avoid a heavy cargo being concentrated excessively on one axle. Furthermore, the signals can indicate to the driver that, during a trip, the cargo has slipped into a position which is critical to the driving state of the vehicle and that it is possible that the cargo may need to be repositioned. In this way, it is possible to detect and eliminate critical cargo states. These additional first sensors can be embodied, for example, as pressure sensors or travel sensors.

In accordance with embodiments of the present invention, the means for adapting the operating pressure to the brake pressure and the control unit can be combined into an EBS modulator. EBS modulators are widely used in vehicle manufacturing and are mass-produced components which are available at favorable prices. On the one hand, the combination into one component simplifies the design of the braking system since connecting lines between the two components can be shortened or omitted, making a contribution to operational reliability. Connecting lines have the disadvantage that, during operation of the vehicle, they are subject to severe loads (for example fluctuations in temperature, aggressive environment due to salt) which can damage them and cause them to lose their functional capability. If their length is shortened or if they can be combined within one component, ideally protected by a housing, this disadvantage can at least be reduced. A further disadvantage overcome by the combination into an EBS modulator is that as the number of components increases, their cabling becomes more complicated and therefore more difficult to implement. The combination of the components into one modulator also simplifies mounting since the EBS modulator, the functional capability of which has been checked, can be installed in a prefabricated form. The probability of incorrect cabling is therefore reduced.

A brake pressure reducing element can, advantageously, be assigned to an axle or a wheel, for reducing the brake pressure as a function of the rotational speed of the axle to be braked or the wheel to be braked. Since just a single brake pressure, which can be applied to the brakes of the wheels of the further axles, is calculated and made available by the EBS modulator or the control unit on the basis of the mean value of the detected axle loads, the brake pressure may be too high for some wheels, which could cause wheel lock. To prevent this, the brake pressure for the respective axle can be reduced using the reducing element. The brake pressure reducing element reduces the brake pressure only if a wheel actually locks. This makes it possible to ensure a high degree of driving safety during braking, without the design of the braking system becoming significantly more complicated. In particular, there is still the advantage that the control unit or the EBS modulator detects just one brake pressure and this can be fed to the brakes of the further axles via a central feed line.

The brake pressure reducing element is advantageously embodied as an ABS modulator. Such components are also widespread in vehicle manufacture and are mass-produced components. They are technically mature and therefore have a high level of reliability at a favorable price. With such components, it is possible to reduce the brake pressure in direct dependence on the wheel speed, with the result that the respective wheels are prevented from locking. For this purpose, it is possible, for example, for a solenoid valve of the ABS modulator to be correspondingly actuated by a control unit such as, for example, the EBS modulator. In this context, only the brake pressure which is applied to the brakes of the respective wheel or of the respective axle which is assigned to the ABS modulator is reduced, but not the brake pressure which is fed to the other brakes.

In accordance with embodiments of the present invention, the EBS modulator of the front axle and an ABS modulator are assigned to all the further axles, or, in each case, one ABS modulator is assigned to each further axle. This means that the brakes of the axle assigned to a modulator are connected directly to the modulator via electrical and pneumatic lines. It is expedient to install the modulators in the spatial vicinity of the assigned axles in order to keep the lines as short as possible. Since the EBS modulator is also connected to the towing vehicle via electrical and pneumatic lines, it is additionally advantageous to assign the EBS modulator to the front axle and to install it proximate the front axle since this allows the lines to the towing vehicle to be kept short. It is generally known that the susceptibility of the lines to faults increases with length. Reducing the length of the lines therefore contributes to operational reliability.

Depending on the requirements, one ABS modulator can be assigned to each further axle, with the result that the brake pressure can be reduced as a function of the rotational speed of the wheels which are assigned to this axle. It is therefore possible to prevent the wheels locking on any further axle, which provides a very high level of safety in traffic when severe deceleration occurs. However, a disadvantage in this case is that an additional ABS modulator has to be provided for each further axle. This raises costs, which can have a disadvantageous effect on market acceptance.

Costs can be reduced in that, irrespective of the number of further axles, just one ABS modulator is provided which reduces the brake pressure in accordance with the rotational speed of all the wheels which are assigned to all the further axles. This is also a way of preventing wheel lock, but it entails the disadvantage that the brake pressure is reduced as soon as one of the wheels begins to lock. Assuming that the vehicle is uniformly loaded and is moving forward, the rearmost axle is relieved of its load to the greatest extent when braking occurs, with the result that the wheels of this axle tend to lock first. If just one ABS modulator is therefore assigned to all the further axles, it will reduce the brake pressure in this situation so that the wheels with reduced brake pressure are also actuated and do not yet lock. Consequently, these wheels do not have the maximum possible braking force applied to them, and the maximum possible deceleration is therefore not achieved. This advantage is, however, relatively small since if the drawbar trailer has a plurality of further axles they are typically arranged spatially close to one another. As a result, the axle loads of the further axles cannot differ very much from one another. The adhesion at the further individual axles is therefore also relatively similar, so that the wheels which are assigned to the respective axles can also be braked with a similar maximum braking force. The braking force which is not used as a result of the provision of just one ABS modulator therefore stays within acceptable limits, so that this design can be justified.

In one embodiment of the present invention, the maximum value of the detected brake pressure is determined by the maximum adhesion of the wheels of the front axle. The underlying basis is that, during braking, the load borne by the front axle is usually at its greatest, with the result that the wheels of the front axle have the maximum adhesion within the vehicle. Consequently, the brake pressure which is detected by the EBS modulator will at least be equal, but will usually be higher, than that which is necessary to lock the wheels of the further axles. This ensures that the detected brake pressure is always that with which the brakes can be actuated in accordance with the maximum available adhesion. If the brake pressure which is detected causes the wheels of the further axles to lock, this can be prevented in the way described above.

In accordance with an embodiment of the present invention, a pressure circuit is provided for making the full operating pressure available at the further axles. This is appropriate for a situation in which the brake pressure detected by the EBS modulator just prevents the front wheels from locking, but the wheels of the further axles are not yet locked even though the respective brakes have been actuated with the detected brake pressure. In such a situation, the wheels of the further axles could therefore be braked with a higher braking force than occurs using the detected brake pressure. This could occur if the vehicle is loaded to an excessive degree in the region of the further axles, that is, mainly in the rear region, with the result that the wheels assigned to these axles also have a higher degree of adhesion than the wheels of the front axles during a braking operation. The full operating pressure which is present in the pressure accumulator can be fed by the brake circuit to the wheels of the further axles, allowing the maximum possible braking force to be applied at the corresponding wheels. This ensures that, even under unusual load conditions, the wheels can be braked in accordance with the maximum adhesion.

The brakes comprise brake cylinders and wheel brakes which are mounted on the wheels. Such components are widely used in vehicle manufacturing, in particular in utility vehicles, since they are distinguished by high reliability and a low level of complexity. The wheel brakes can be embodied as drum brakes or disk brakes which can be actuated by the brake cylinder via an activation rod. In order to bring about uniform wear of the brake linings, it is advantageous to use the same type of brake cylinders on all the axles.

Information relating to the movement state of the towing vehicle can be fed to the EBS modulator and/or the first and second sensor signals can be fed to the towing vehicle by means of the transmission unit. Increasingly, modern towing vehicles are equipped with braking systems which generate/process large amounts of information in the performance of a braking operation—from information relating to the movement state of the towing vehicle, for example, to vehicle speed, yaw rate, distance to a vehicle travelling ahead, etc. In order to correctly characterize the movement state of the towing vehicle, it is also important to take into account whether a trailer is being towed, and the movement state of the trailer. The first and second sensor signals which are generated by the drawbar trailer braking system according to embodiments of the present invention can advantageously be fed to a corresponding braking system of the towing vehicle in order to be taken into account during braking processes. On the other hand, information about the movement state of the towing vehicle can also be fed to the EBS modulator of the drawbar trailer. In this way, braking processes can be configured such that they take into account movement states not only of the towing vehicle but also of the drawbar trailer being towed. This contributes to increased safety in traffic. It is also contemplated that, in this context, braking processes be carried out selectively without brake signals output by the vehicle operator, so that unstable movement states can be counteracted at the initial stage.

A method for braking a drawbar trailer that has two or more axles in accordance with an embodiment of the present invention includes the following steps: (i) generating, by means of first sensors, first sensor signals relating to the axle load of at least one axle, where, in each case, one of the first sensor signals is assigned to each axle, (ii) generating, by means of second sensors, second sensor signals relating to the rotational speed of the wheels of the axles, where, in each case, one of the second sensor signals is assigned to each axle, (iii) using a transmission unit, transmitting brake signals generated in the towing vehicle between the towing vehicle and the drawbar trailer, (iv) providing a pneumatic operating pressure by means of a compressed air source, (v) receiving the information transmitted from the transmission unit, and of the brake signals and of the first and second sensor signals by means of a control unit, (vi) determining the axle load using the control unit, (vii) detecting the value of the brake pressure for actuating the brakes as a function of the specific axle load and the received brake signals by means of the control unit, (viii) using the control unit to actuate means for adapting the value of the operating pressure to the brake pressure, (ix) adapting the value of the operating pressure to the brake pressure, (x) feeding the brake pressure to the brakes by means of feed lines, and (xi) braking the drawbar trailer using brakes which can be actuated with the brake pressure.

According to an advantageous embodiment of the inventive method, the control unit detects the axle load of the first axle by means of the first sensor signals, and the axle load of the further axles by means of the difference in slip between the first axle and the further axles, where the difference in slip is calculated using the second sensor signals. In this way, it is sufficient to use a first sensor for just the front axle. The second sensors are present on a series-production basis in modern towing vehicles, so that the difference in slip between the front axle and the further axles can easily be detected.

According to another advantageous embodiment of the inventive method, the control unit detects the value of the brake pressure by using the mean value of the detected axle loads. Calculating a mean value is a relatively simple computing operation which does not require any complicated algorithms. This calculation can therefore be implemented easily on the control unit and it does not make large demands of the performance or capacity of the computer.

In accordance with yet another embodiment of the inventive method, the control unit detects the brake pressure on the basis of the maximum axle load present. Since the maximum adhesion is also present at the axle with the maximum axle load, this embodiment ensures that the EBS modulator always detects the maximum possible brake pressure, and, as a result, it can also take into account cases in which the further axles are subject to significantly larger loads than the front axle. For this purpose, one or more pressure-sensitive components, for example, folding bellows or pistons, which generate a rising pressure as the load increases, can be mounted on each axle. These components are connected to a pressure sensor via a select-high valve. In this way, the maximum pressure is always applied to the pressure sensor and can be used to infer the maximum axle load present.

Further, in accordance with embodiments of the method of the present invention, the control unit can detect the brake pressure by using groups of characteristic curves selected as a function of at least one of the signals from a group comprising the first and second sensor signals and the brake signals. The groups of characteristic curves are used to create assignment functions which assign an input signal to an output signal. The brake signal, to which the brake pressure can be assigned as an output signal, is typically used as the input signal. Other input variables can also be used—for example, frequent changes in the axle loads (first sensor signals) or very different rotational speeds of the wheels (second sensor signals), these indicating an unstable state of the drawbar trailer and making a braking operation advisable. The groups of characteristic curves can have a plurality of sections, and if the brake signal which is generated by the vehicle operator is used as an input signal, a constant brake pressure can be assigned as an output signal to a first region which represents a requirement for a low braking force. This brings about uniform activation of the brakes, which leads to more uniform loading and utilization of the brake linings, with the result that they have to be replaced less frequently. In the region of requirements for relatively high braking force, the groups of characteristic curves assign to the brake signal a brake pressure which permits maximum use of the adhesion which is present. The groups of characteristic curves include a set of assignment functions in which a specific type of towing vehicle, a specific range of axle load or a specific difference in slip can be represented by a specific assignment function. The selection of the correct assignment function from the group of characteristic curves can either be carried out by means of an input unit, in the case of the selection of the towing vehicle, or using the first and second sensor signals, in the case of the axle load ranges or the difference in slip. The assignment functions can be implemented as linear functions. This allows the corresponding values of the output signals to be assigned to the values of the input signals with few computational steps, as a result of which only a small amount of pressure storage space is required in the control unit and a large number of computational steps can be executed in a short time. The detected brake pressure can therefore be adapted in real-time to the frequently changing drive states of the vehicle or to the braking force requirements of the vehicle.

Figure 1:
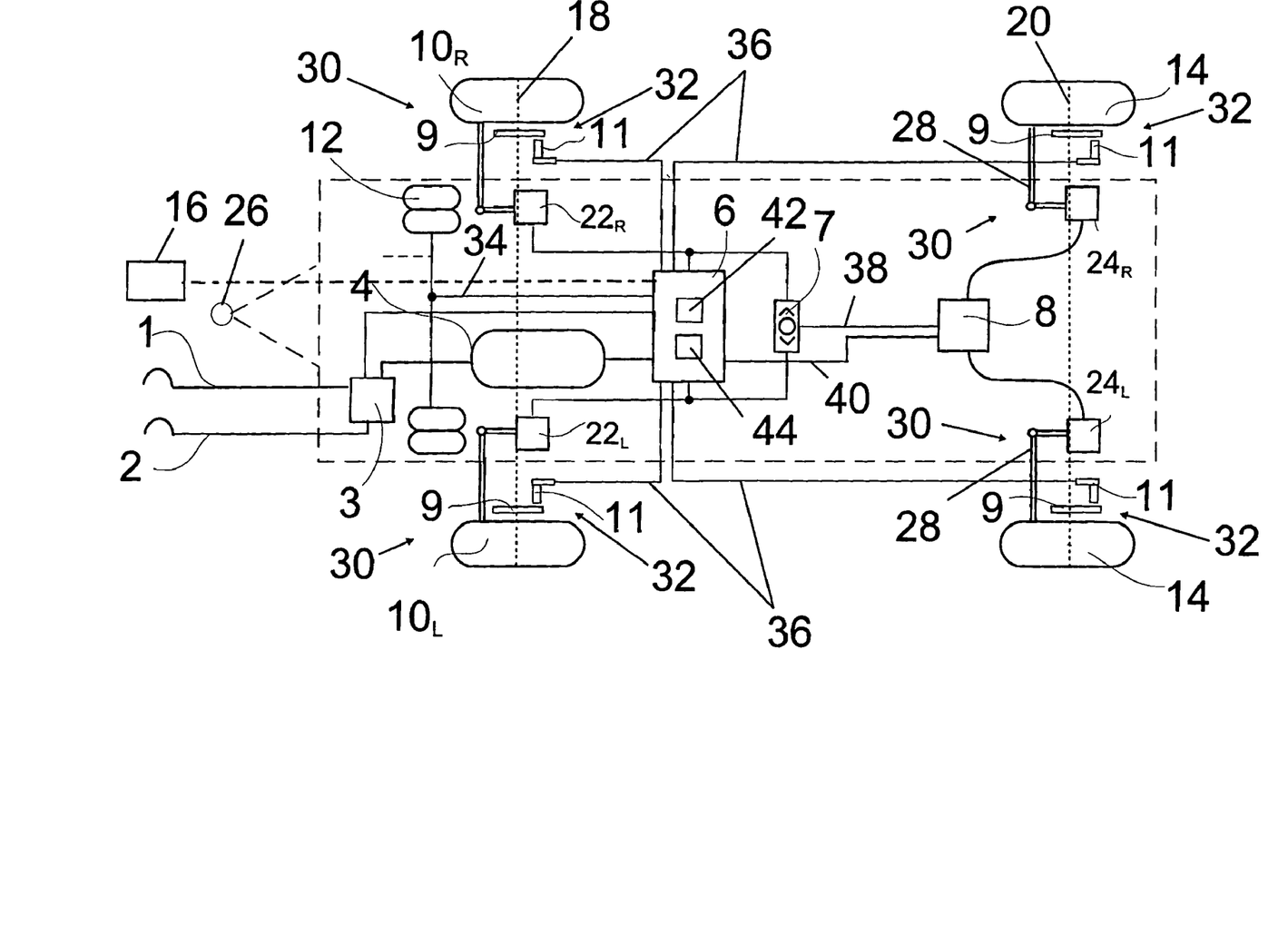
FIG. 1 shows an exemplary embodiment of a drawbar trailer with a braking system according to the present invention.

Referring now to FIG. 1, the illustrated drawbar trailer has a front axle 18 and a further axle 20. Front axle 18 can be steered by means of a drawbar 26 and connected to a towing vehicle (not illustrated). Wheels 10 are assigned to front axle 18, and wheels 14 are assigned to further axle 20. Braking system 30 includes brake cylinders 22, 24, an activation rod 28 and wheel brakes (not illustrated). Brake cylinders 22 are assigned to front axle 18, and brake cylinders 24 are assigned to further axle 20.

The drawbar trailer also has an EBS modulator 6 which can be connected to a pressure accumulator 4 for compressed air. EBS modulator 6 includes a control unit 42 and means 44 (e.g., a valve unit or the like) for adapting the operating pressure to the detected brake pressure. The pressure accumulator 4 can be filled with compressed air from the towing vehicle or from an external compressed air source via brake lines 1 and a trailer brake valve 3. Pressure accumulator 4 makes available a pneumatic operating pressure. Trailer brake valve 3 includes a non-return valve (not illustrated) for safeguarding the operating pressure. Furthermore, a device (not illustrated) for automatically applying the brakes of the drawbar trailer if the brake line 1 is ruptured can be provided. EBS modulator 6 can be connected to the towing vehicle by means of a transmission unit, e.g., an electrical brake line 16, so that brake signals and further information relating to the movement state of the towing vehicle can be transmitted from the towing vehicle to the EBS modulator and vice-versa. The information can be transmitted via the brake line 16 or wirelessly.

In addition, the drawbar trailer has first sensors 12 which are embodied in the illustrated example as pressure sensors and as air bellows and are assigned to the front axle 18. The first sensors 12 generate first sensor signals which represent the axle load of the front axle 18.

All four wheels 10, 14 are provided with second sensors 32 which include an ABS sensor 9 and a pole wheel 11. The second sensors 32 generate second sensor signals which represent the rotational speed of the wheels 10, 14. Signals from the first and second sensors are fed to EBS modulator 6 by means of transmission lines 34, 36.

The means for adapting the operating pressure to the detected brake pressure can be implemented with a pressure regulating duct. Means (e.g., valve unit) 44 is connected to brake cylinders 22, 24 via compressed air lines 38, so that it can be operated using the operating pressure.

A 3/2-way valve 7 and an ABS modulator 8 are arranged in the part of the compressed air line 38 which extends between EBS modulator 6 and brake cylinders 24 which are assigned to the wheels of further axle 20.

When the trailer travels without braking, that is, when a brake signal is not transmitted from the towing vehicle to EBS modulator 6, first sensors 12 generate the first sensor signals which represent the static axle load of front axle 18. Second sensors 32 generate the second sensing signals which represent the rotational speed of the wheels 10, 14 of the drawbar trailer. The first and the second sensor signals are fed to EBS modulator 6 which calculates the static axle load of front axle 18 from the first sensor signals.

If EBS modulator 6 then receives a brake signal from the towing vehicle, the measured axle load no longer corresponds to the static axle load but rather to the instantaneous axle load. The difference between the two loads is the dynamic axle load. Further axle 20 is relieved of its load by the absolute value of the dynamic axle load owing to the braking operation. If the static axle load of the further axle is known, the instantaneous axle load of the further axle can be inferred on the basis of the calculated dynamic axle load without a further, first sensor being required. The static axle load can be detected on the basis of the geometry of the drawbar trailer, but this is relatively imprecise and, furthermore, it is very costly, to allow for changes in axle load owing to the cargo— this being impossible if the distribution of the axle load changes during a journey owing to slippage of objects in the cargo. In addition, the axle load can be determined in this way only if there is one further axle 20 and not a plurality of further axles 20.

The detected distribution of the axle loads is used as a measure of how to distribute the braking force or the brake pressure among the respective axles. An axle which bears a greater load has a higher level of adhesion between the braked wheel and the road surface, with the result that a stronger braking force can also be applied to this axle.

In the illustrated example, EBS modulator 6 uses the first and second sensor signals to detect a brake pressure which can be applied to the front axle 18 without the wheels locking. Nevertheless, if the brake pressure is too high and the wheels lock, the stationary state of the locked wheels is signaled to EBS modulator 6 by second sensors 32 using the second sensor signals and the transmission lines, in response to which the EBS modulator reduces the brake pressure until the wheels no longer lock.

In this context, a situation might occur in which, for example, the left front wheel $10_L$ locks earlier than the right front wheel $10_R$. This might be due to the right front wheel $10_R$ being subjected to a higher load, for example due to unequal distribution of the cargo. Furthermore, different coefficients of friction might be present on the road if there is oil, for example, on the section of the road beneath the left front wheel $10_L$. In this case, EBS modulator 6 would reduce the brake pressure applied to brake cylinder $22_L$ until the left front wheel $10_L$ no longer locks. However, brake cylinder $22_R$ continues to be braked with the detected brake pressure. For this purpose, EBS modulator 6 has two outputs, so that different brake pressures can be applied to brake cylinders $22_L$ and $22_R$, and front wheels $10_L$ and $10_R$ can be braked selectively, in the present case, that is, wheel $10_L$ can be braked with the reduced brake pressure, and wheel $10_R$ can be braked with the detected brake pressure. Nevertheless, in order to be able to pass on the detected brake pressure to brake cylinders 24 of further axle 20, 3/2-way valve 7 is provided. Valve 7 is connected to both outputs of EBS modulator 6 and performs a select-high function, that is, it passes on the higher of the two pressures modulated at the outputs of the EBS modulator to brake cylinders 24.

In an alternative embodiment (not illustrated), the 3/2-way valve 7 can also be omitted, in which case the EBS modulator just has one output. In addition, front wheels $10_L$ and $10_R$ are connected via an ABS valve. If one of the front wheels 10 locks, the brake pressure is reduced until it is no longer locked. However, since the EBS modulator has just one output, the lower brake pressure is applied to the other front wheel, which does not lock. Consequently, a select-low regulating process occurs. This lower brake pressure is also applied to the brake cylinders of the further axle.

In the embodiment of the present invention depicted in FIG. 1, which includes 3/2-way valve 7, the brake pressure which is detected by EBS modulator 6 is fed not only to brake cylinders 22 of front axle 18 but also to those of further axle 20. Consequently, the brake pressure can cause wheels 14 of further axle 20 to lock. This is a typical situation since, when the vehicle is travelling forward, braking brings about an increase in the load on front axle 18 and, correspondingly, relieves the load on further axle 20. As a result, wheels 14 of further axle 20 already lock at a relatively low brake pressure. However, wheel lock is, generally, to be prevented, otherwise instability of the drawbar trailer will result. In order to prevent wheels 14 of further axle 20 from locking, ABS modulator 8 is provided in the part of the compressed air line located between EBS modulator 6 and brake cylinders 24 of further axle 20. ABS modulator 8 has essentially the function of a pressure reducing element which can reduce the brake pressure as a function of the rotational speed of the wheels. If second sensors 22, which are assigned to the wheels of the further axle, detect that wheels 14 are locking, ABS modulator 8 reduces the brake pressure until the wheels are no longer locked. For this purpose, EBS modulator 6 is connected via a control line 40 to a solenoid valve (not illustrated) of ABS modulator 8, as a result of which it is possible for EBS modulator 6 to reduce the brake pressure on the basis of the second sensor signals until locking no longer occurs at any of wheels 14.

In the illustrated example, the brake pressure can be changed only on an axle-by-axle basis, with the result that the same brake pressure is always applied to the brake cylinders of the wheels of one particular axle. This is due to the wheel loads of the wheels of an axle varying to a significantly smaller extent than those of wheels on different axles. Nevertheless, situations may occur in which ABS modulator 8 reduces the brake pressure because one of the wheels is locking even though the other wheel or the other wheels on the same axle could be braked with a larger braking force. This can occur if the wheels of one axle have been subject to very different degrees of wear or if the road surface has very different coefficients of friction, for example, due to a locally limited patch of oil or a puddle which affects just one wheel or one group of wheels on an axle. Even if the maximum possible braking force is not applied by the inventive braking system, in such a case, this is, nevertheless, acceptable, or even advantageous. If a wheel on one side is braked to a significantly greater degree than the wheel on the other side on the same axle, a strong yaw moment would be generated and the vehicle would therefore be rotated about a vertical axis, which could lead to vehicle instability.

If further axle 20 has a significantly larger axle load than front axle 18, for example due to a heavy load which is located above further axle 20 owing to an unequally distributed cargo, the brake pressure made available by EBS modulator 6 ensures that the wheels of front axle 18 are just prevented from locking. However, wheels 14 of further axle 20 could still be braked with a significantly larger braking force owing to the large axle load, but this is not possible with the brake pressure made available by EBS modulator 6. Consequently, the drawbar trailer would no longer be braked with the maximum possible braking force, that is, it would be underbraked, which is undesirable in terms of minimizing braking distance. For such a situation, a pressure circuit (not illustrated) can be provided with an additional valve which permits it to feed the full operating pressure, made available by pressure accumulator 4, to brake cylinders 24 of further axle 20. The additional valve is correspondingly switched in this case by EBS modulator 6. Consequently, wheels 14 of further axle 20 can be braked with the maximum possible braking force. If the operating pressure which is made available by pressure accumulator 4 leads to locking of wheels 14, ABS modulator 8 reduces the operating pressure in the manner discussed above. If the state is restored in which the brake pressure detected by EBS modulator 6 is sufficient to lock wheels 14 assigned to further axle 20, the additional valve is switched such that the brake pressure is applied again, and not the operating pressure of the compressed air source.

Accordingly, the present invention provides a drawbar trailer braking system of efficient construction and a braking method whereby axle-load-dependent distribution of braking force is made possible at any desired number of axles of the drawbar trailer while maintaining vehicle stability. Also, the drawbar trailer braking operation can be effected by electronic means even if no pneumatic control pressure is made available by the towing vehicle.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A braking system for braking a drawbar trailer having axles including a front axle and at least one further axle, each of the axles having at least two wheels, the braking system comprising:
    first sensors for generating first sensor signals representing an axle load of at least one of the axles, ones of the first sensor signals being assigned to corresponding ones of the axles;
    second sensors for generating second sensor signals representing rotational speed of the wheels of the axles, ones of the second sensor signals being assigned to corresponding ones of the axles;
    an EBS modulator assigned to the front axle;
    a pressure accumulator for providing and storing a pneumatic operating pressure;
    brakes for braking the drawbar trailer, the brakes being actuable by a pneumatic brake pressure;
    at least one of a brake line and a transmission unit for transmitting brake signals generated in a towing vehicle between the towing vehicle and the drawbar trailer;
    a control unit configured to:
        receive the brake signals and the first and second sensor signals, and
        determine the axle load; and
    an adapter configured to adapt a value of the pneumatic operating pressure to the pneumatic brake pressure, the pneumatic brake pressure being feedable to the brakes by feed lines, the adapter being actuable by a drive unit;
    wherein the control unit is configured to:
        detect a value of the pneumatic brake pressure for actuating the brakes as a function of the axle load of the front axle and the at least one further axle as well as the received brake signals, and
        actuate the adapter such that the detected brake pressure is modulated with the same value at the front axle and at the at least one further axle.

2. The braking system according to claim 1, wherein one of the first sensors is assigned to the front axle.

3. The braking system according to claim 1, wherein the first sensors are at least one of pressure sensors and travel sensors.

4. The braking system according to claim 1, wherein the second sensors include a pole wheel and an ABS sensor.

5. The braking system according to claim 2, wherein additional first sensors are provided to the at least one further axle to generate sensor signals which represent the axle load of the at least one further axle.

6. The braking system according to claim 5, wherein the additional first sensors are at least one of pressure sensors and travel sensors.

7. The braking system according to claim 1, further comprising a brake pressure reducing element assigned to at least one of the axles and the wheels, the brake pressure reducing element being configured to reduce the brake pressure as a function of rotational speed of at least one of the axles and the wheels to be braked.

8. The braking system according to claim 7, wherein the brake pressure reducing element is an ABS modulator.

9. The braking system according to claim 8, wherein the EBS modulator and the ABS modulator are assigned to all ones of the at least one further axle.

10. The braking system according to claim 8, wherein the ABS modulator is assigned to each of the at least one further axle.

11. The braking system according to claim 1, wherein a maximum of the value of the detected brake pressure is determined based on maximum adhesion of the wheels of the front axle.

12. The braking system according to claim 1, further comprising a pressure circuit for making available full operating pressure at the at least one further axle.

13. The braking system according to claim 1, wherein the brakes include brake cylinders and wheel brakes mounted on the wheels.

14. A braking system for braking a drawbar trailer having axles including a front axle and at least one further axle, each of the axles having at least two wheels, the braking system comprising:
    first sensors for generating first sensor signals representing an axle load of at least one of the axles, ones of the first sensor signals being assigned to corresponding ones of the axles;
    second sensors for generating second sensor signals representing rotational speed of the wheels of the axles, ones of the second sensor signals being assigned to corresponding ones of the axles;
    an EBS modulator associated with the front axle;
    a pressure accumulator for providing and storing a pneumatic operating pressure;
    brakes for braking the drawbar trailer, the brakes being actuable by a pneumatic brake pressure;
    at least one of a brake line and a transmission unit for transmitting brake signals generated in a towing vehicle between the towing vehicle and the drawbar trailer;
    a control unit configured to:
        receive the brake signals and the first and second sensor signals, and
        determine the axle load; and
    an adapter configured to adapt a value of the pneumatic operating pressure to the pneumatic brake pressure, the pneumatic brake pressure being feedable to the brakes by feed lines, the adapter being actuable by a drive unit, wherein the adapter is integrated into the EBS modulator;
    wherein the control unit is configured to:
        detect a value of the pneumatic brake pressure for actuating the brakes as a function of the axle load of the front axle and the at least one further axle as well as the received brake signals; and
        actuate the adapter such that the detected brake pressure is modulated with the same value at the front axle and at the at least one further axle.

15. The braking system according to claim 7, wherein the transmission unit is configured to at least one of:
    feed information relating to the movement state of the towing vehicle to the EBS modulator, and feed the first and second sensor signals to the towing vehicle.

16. A method for braking a drawbar trailer having a front axle and at least one further axle, the method comprising the steps of:
generating first sensor signals representing an axle load of at least one of the front axle and the at least one further axle using first sensors, ones of the first sensor signals being assigned to corresponding ones of the axles;
generating second sensor signals representing rotational speed of the wheels of the axles using second sensors, ones of the second sensor signals being assigned to corresponding ones of the axles;
transmitting brake signals generated in a towing vehicle between the towing vehicle and the drawbar trailer using at least one of a brake line and a transmission unit;
providing and storing a pneumatic operating pressure using a pressure accumulator;
receiving, via a control unit of an EBS modulator:
information transmitted from at least one of the brake line and the transmission unit,
the brake signals, and
the first and second sensor signals;
determining the axle load using the control unit;
detecting a value of the brake pressure for actuating brakes as a function of the axle load and the brake signals using the control unit;
actuating an adapter of the EBS modulator for adapting a value of said operating pressure to said brake pressure using the control unit;
adapting the value of said operating pressure to the brake pressure using the adapter;
feeding the brake pressure to the brakes using feed lines; and
braking the drawbar trailer using the brakes, the brakes being actuated with the brake pressure, wherein an ABS modulator associated with the at least one further axle reduces the brake pressure fed to the at least one further axle as needed to prevent the at least one further axle from locking.

17. The method according to claim 16, further comprising the step of calculating a difference in slip between said front axle and the at least one further axle using the second sensor signals, and wherein the control unit detects:
the axle load of said front axle using the first sensor signals, and
the axle load of the at least one further axle using the difference in slip.

18. The method according to claim 16, wherein the step of detecting a value of the brake pressure for actuating brakes as a function of the axle load and the brake signals using the control unit is based on a maximum axle load.

19. A method for braking a drawbar trailer having a front axle and at least one further axle, the method comprising the steps of:
generating first sensor signals representing an axle load of at least one of the front axle and the at least one further axle using first sensors, ones of the first sensor signals being assigned to corresponding ones of the axles;
generating second sensor signals representing rotational speed of the wheels of the axles using second sensors, ones of the second sensor signals being assigned to corresponding ones of the axles;
transmitting brake signals generated in a towing vehicle between the towing vehicle and the drawbar trailer using at least one of a brake line and a transmission unit;
providing and storing a pneumatic operating pressure using a pressure accumulator;
receiving, via a control unit:
information transmitted from at least one of the brake line and the transmission unit,
the brake signals, and
the first and second sensor signals;
determining the axle load using the control unit;
calculating a mean value of the detected axle loads;
detecting a value of the brake pressure for actuating brakes as a function of the axle load and the brake signals using the control unit;
actuating an adapter for adapting a value of the operating pressure to the brake pressure using the control unit;
adapting the value of the operating pressure to the brake pressure using the adapter;
feeding the brake pressure to the brakes using feed lines; and
braking the drawbar trailer using the brakes, the brakes being actuated with the brake pressure.

20. A method for braking a drawbar trailer having a front axle and at least one further axle, the method comprising the steps of:
generating first sensor signals representing an axle load of at least one of the front axle and the at least one further axle using first sensors, ones of the first sensor signals being assigned to corresponding ones of the axles;
generating second sensor signals representing rotational speed of the wheels of the axles using second sensors, ones of the second sensor signals being assigned to corresponding ones of the axles;
transmitting brake signals generated in a towing vehicle between the towing vehicle and the drawbar trailer using at least one of a brake line and a transmission unit;
providing and storing a pneumatic operating pressure using a pressure accumulator;
receiving, via a control unit:
information transmitted from at least one of the brake line and the transmission unit,
the brake signals, and
the first and second sensor signals;
determining the axle load using the control unit;
detecting a value of the brake pressure for actuating brakes as a function of the axle load and the brake signals using the control unit based on characteristic field lines selected as a function of at least one of the signals from the group consisting of the first and second sensor signals and the brake signals;
actuating an adapter for adapting a value of the operating pressure to the brake pressure using the control unit;
adapting the value of the operating pressure to the brake pressure using the adapter;
feeding the brake pressure to the brakes using feed lines; and
braking the drawbar trailer using the brakes, the brakes being actuated with the brake pressure.

* * * * *

UNITED STATES PATENT AND TRADEMARK OFFICE
CERTIFICATE OF CORRECTION

PATENT NO. : 8,267,485 B2
APPLICATION NO. : 12/386963
DATED : September 18, 2012
INVENTOR(S) : Holger Barlsen et al.

It is certified that error appears in the above-identified patent and that said Letters Patent is hereby corrected as shown below:

In the Claims:

Column 14, Claim 15, line 64, should be corrected as follows:

15. The braking system according to claim "7" --14--, wherein the

Signed and Sealed this
Twentieth Day of November, 2012

David J. Kappos
*Director of the United States Patent and Trademark Office*